US008988419B2

(12) United States Patent
Huang

(10) Patent No.: US 8,988,419 B2
(45) Date of Patent: Mar. 24, 2015

(54) PARAMETERIZATION OF DEFORMATION AND SIMULATION OF INTERACTION

(76) Inventor: Ding Huang, Penshurst (AU)

( * ) Notice: Subject to any disclaimer, the term of this patent is extended or adjusted under 35 U.S.C. 154(b) by 2083 days.

(21) Appl. No.: 10/416,459

(22) PCT Filed: Nov. 27, 2001

(86) PCT No.: PCT/AU01/01539
§ 371 (c)(1),
(2), (4) Date: Oct. 6, 2003

(87) PCT Pub. No.: WO02/43006
PCT Pub. Date: May 30, 2002

(65) Prior Publication Data
US 2004/0095352 A1  May 20, 2004

(30) Foreign Application Priority Data

Nov. 27, 2000  (AU) ........................... PR1696
Dec. 4, 2000  (AU) ........................... PR1890
Dec. 28, 2000  (AU) ........................... PR2332
Jun. 8, 2001  (AU) ........................... PR5599
Sep. 11, 2001  (AU) ........................... PR7592

(51) Int. Cl.
*G06T 15/00* (2011.01)
*G06T 15/08* (2011.01)
*G06T 13/40* (2011.01)
*G06T 17/10* (2006.01)
*G06T 19/00* (2011.01)

(52) U.S. Cl.
CPC ................. *G06T 13/40* (2013.01); *G06T 17/10* (2013.01); *G06T 19/00* (2013.01)
USPC ........................................................ 345/419

(58) Field of Classification Search
None
See application file for complete search history.

(56) References Cited

U.S. PATENT DOCUMENTS 5,818,452 A * 10/1998 Atkinson et al. ............... 345/420
5,892,691 A *  4/1999 Fowler .............................. 703/6
(Continued)

OTHER PUBLICATIONS

Gagvani, N., Kenchammana-Hosekote, D., Silver, D., Volume Animation using the Skeleton Tree, 1998, IEEE Symposium on Volume Visualization, pp. 47-54.*
(Continued)

*Primary Examiner* — Said Broome
(74) *Attorney, Agent, or Firm* — Leason Ellis LLP.

(57) ABSTRACT

A method of using parametrical representations in modeling and animation is disclosed. This method is built directly on the inherent properties of parametric curves. Parametric curves are constructed and associated with geometric models, while at the same time the properties are used to represent the underlying mechanism of deformation. This method includes the steps of building parametrical representations on a geometric model, associating vertices of the model with different ones of the parametrical representations to effect movement thereof, and animating movement of the vertices to simulate relative motion therebetween.

The invention discloses a method in which simulation of object interaction and object deformation can be integrated into a unified framework through skeletal trees. The method preprocesses a graphic object and segments the object into a number of contexts at surface slope and curvature discontinuities. Then, control points are generated to represent these contexts. Based on these control points, a skeletal tree of the object can be built. Assisted by spatial decomposition, the skeletal trees can be directly used in the simulation of object interaction.

17 Claims, 9 Drawing Sheets

(56) References Cited

U.S. PATENT DOCUMENTS

| | | | | |
|---|---|---|---|---|
| 6,031,539 | A * | 2/2000 | Kang et al. | 345/419 |
| 6,064,390 | A * | 5/2000 | Sagar et al. | 345/420 |
| 6,317,130 | B1 * | 11/2001 | Ishikawa et al. | 345/473 |
| 6,400,368 | B1 * | 6/2002 | Laperriere | 345/473 |
| 6,486,882 | B1 * | 11/2002 | Wolverton et al. | 345/475 |
| 6,535,215 | B1 * | 3/2003 | DeWitt et al. | 345/473 |
| 6,714,661 | B2 * | 3/2004 | Buddenmeier et al. | 382/103 |
| 6,731,287 | B1 * | 5/2004 | Erdem | 345/473 |

OTHER PUBLICATIONS

Lamousin, H., Waggenspack, W., NURBS-Based Free-Form Deformations, 1994, IEEE Computer Graphics & Applications, vol. 14, No. 9, pp. 59-65.*

Schmalstieg, D., Fuhrmann, A., Coarse View-Dependent Levels of Detail for Hierarchical and Deformable Models, 1999, Technical Report TR-186-299 -20, Vienna University of Technology, pp. 1-13.*

Pourazady, M., Xu, X., Direct manipulations of B-spline and NURBS curves, Feb. 2000, Advances in Engineering Software, vol. 31, Issue 2, pp. 107-118.*

Singh, K., Fiume, E., Wires: A Geometric Deformation Technique, Jul. 1998, Proceedings of the 25th annual conference on Computer graphics and interactive techniques, pp. 405-414.*

Chen, D., Zeltzer, D., Pump It Up: Computer Animation of a Biomechanically Based Model of Muscle Using the Finite Element Method, Jul. 1992, ACM, Proceedings of the 19th annual conference on Computer graphics and interactive techniques, pp. 89-98.*

Terzopoulos, D., Waters, K., Physically-Based Facial Modeling, Analysis, and Animation, Jan. 1990, Journal of Visualization and Computer Animation, pp. 1-18.*

Huang et al.: "Modeling of facial expressions using NURBS curves" Lecture Notes in Computer Science, vol. 2252, pp. 216-223, Springer, Berlin, 2001.

* cited by examiner

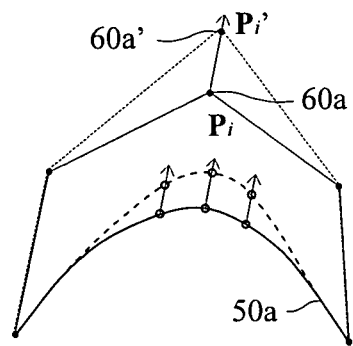
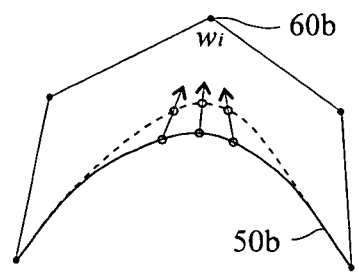
FIG. 1A    FIG. 1B
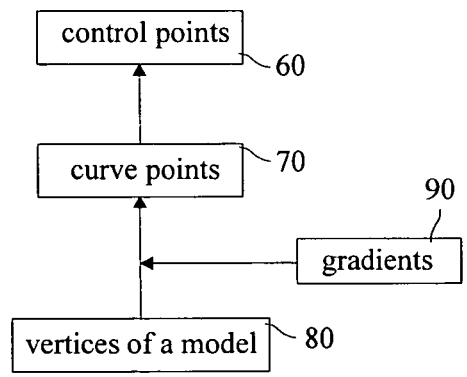
FIG. 2

PARAMETERIZATION OF DEFORMATION AND SIMULATION OF INTERACTION

FIELD OF INVENTION

This invention relates to the fields of modeling and animation of complex objects, and the fields of computer graphics, interactive simulation, and geometric modeling, specifically to realistic modeling and animation of complex objects, such as human faces, and to simulation of object deformation and object interaction.

BACKGROUND OF INVENTION

The simulation of dynamic processes using parametric representations is an actively pursued area. A significant advantage of parametric representation is that every point on a parametric curve or surface is determined, from only a limited number of control points. Another benefit is the existence of industry standards for parametric representations. Deformation methods that use parametric representations are usually divided into those that are related to object representation (e.g. parametric patches), and those that are independent of object representation (e.g. free-form deformation).

Objects can be parametrically represented by parametric surfaces. Initially, parametric patches were intensively used in the CAD/CAM industry. Parametric patches were later adapted to approximate and deform complex objects such as human beings (Waite, Hoch et al, Wang and Forsey). For parametric patches to model complex objects, patches are fitted to the surface points and continuity constraints must be maintained across patch boundaries. The patch surface and the object surface are not exactly the same, since parametric patches cannot easily be fitted to complex objects. Continuity constraints may limit the deformation of body movement that the parametric patches aim to simulate. Furthermore, these approaches lack high-level abstraction for shape control (Watt and Policarpo).

Free-form deformation (FFD) embeds an object in a lattice space and deforms the lattice space, thus causing the object to become deformed (Sederberg and Parry). After the initial introduction of FFD, different variations of FFD were proposed. These variations include extended free-form deformation (Coquillart), rational free-form deformation (Kalra et al, Lamousin and Waggenspack), direct free-form deformation (Hsu et al) and Dirichlet free-form deformation (Moccozet and Thalmann), etc. A similar technique is the space deformation (Bechmann). FFD requires transformation of coordinates between object space and lattice space, and transformation is required for each vertex. Furthermore, FFD is generally considered as a global and coarse deformation approach, and thus not suitable for modeling complex, subtle and local deformation, such as facial movement (Watt and Watt).

Facial animation is generally considered as a difficult area in modeling and animation, since there are many muscles on the face and they affect each other. Facial animation also has the obvious challenge of achieving desirable reality in modeling and animation. Parke and Waters surveyed the techniques of facial animation in "Computer Facial Animation". Many surveyed methods do not use parametric representations. Singh and Fiume proposed a deformation approach that was inspired by armatures used by sculptors and was also related to axial deformation in the prior art. A wire in their approach is a curve that is used in controlling deformation of a geometric model. However, a wire only offers coarse representations, and the mechanism of muscle movement is not simulated in their method.

The methods using parametric representations in modeling and animation heretofore known suffer from additional disadvantages, which include:

(a) Static shapes are primarily parameterized. Parameterization mainly means the setup of a parametric model. For animation methods using parametric patches, the static shapes of geometric objects are approximated by parametric patches. FFD embeds an object in lattice space, when the object is in static shape.

(b) The parameterization and deformation tend to be isolated. Deformation of geometric modeling is controlled by animators. As a result, deformation may not be intuitive to users. For FFD, when an animator moves a control point in lattice space, a model embedded in the lattice may not move as the animator desires.

Traditional application of parametric curves in computer graphics includes creating surfaces, key-framing and setting motion paths, etc. Curves are also intensively used in fitting data in science and engineering.

The deformation of individual objects and the interaction of multiple objects are closely related in real life, but are traditionally approached quite differently in graphic simulation. Articulated skeletons are useful tools frequently used in object deformation, object representation, reconstruction and recognition, etc. Simulation of object interaction involves collision detection and response. Collision detection in the prior art basically relies on interference checking between simple geometric entities. Because of the lack of consistency across the literature, it is emphasized in this document that simulation of object interaction means collision detection and response, and the deformation of individual objects alone is not considered as object interaction.

The problem of collision detection has been extensively studied from different perspectives. Lin and Gottschalk, and Jiménez et al. provided recent surveys of the topic. Most methods are built on interference testing of polyhedra that represent objects. To speed up the testing, hierarchical bounding entities are used to approximate these polyhedra. Distances between these bounding entities are checked and potential interference is identified. When objects are in close proximity, spatial decomposition techniques are normally used to test exact interference.

To achieve realistic simulation, volumetric representation has advantages over conventional surface representation, primarily because volumetric data is a more natural representation for the objects and is able to represent the internal structures.

Skeletons can be built from volumetric models. Zhou and Toga proposed a voxel-coding based skeletonization method. Gagvani et al. proposed the construction of a volumetric skeleton tree using distance transform. These methods are basically not oriented towards simulation of object interaction.

Gibson proposed a linked volume representation for modeling interaction of volumetric objects, in which each element in a sampled volume is explicitly linked to its six nearest neighbors. By modifying these links, this method can simulate various object interactions, such as collision detection and response, object deformation, carving, cutting, tearing, joining, etc. The method can be considered as an improved version of the original occupancy map method. This method consumes a vast amount of memory and exhibits inertial and damping behavior. He et al. proposed a probability model of hierarchical data to take account of the lack of explicit surfaces. However, object interaction in this model was built on the conventional surface-based approach, which uses hierarchical bounding entities.

The methods heretofore known suffer from a number of disadvantages:

(a) Simulations of object deformation and object interaction are treated as distinctly different operations. In addition, simulation of collision detection and collision response also lacks a unified framework.

(b) For surface-based approach in the prior art, construction of hierarchical bounding entities is usually time-consuming. Furthermore, when objects deform, the bounding entities need to be updated.

(c) Simulation of object interaction of volumetric models either uses occupancy map method or its variations, or resorts to the conventional surface-based approach in the prior art.

OBJECTS AND ADVANTAGES

Accordingly, several objects and advantages of this invention are:

(a) To provide a method that uses parametric representations in modeling and animation.

(b) To provide a method that integrates parameterization and deformation.

(c) To provide a method that offers high-level abstraction.

Other objects and advantages are to provide a method which is anatomy-based for animation, which is intuitive to users. Still other objects and advantages will become apparent from a consideration of the ensuing description and drawings.

Accordingly, several objects and advantages of the present invention are:

(d) To provide a method that unifies simulation of object deformation and object interaction.

(e) To provide a method that is based on volumetric models.

(f) To provide a method that makes externally built entities (e.g. hierarchical bounding objects) unnecessary. Thus, no update of these external entities is needed during object deformation. Therefore, the overall coat of interactive simulation may be dramatically decreased.

To bring the simulation of object deformation and object interaction into a unified framework, the present invention uses a common set of tools that can be used in simulating the two procedures. Therefore, another object and advantage is to provide a method that can develop tools not only oriented to controlling deformation of objects, but also oriented to simulating the interaction of objects.

The present invention builds a skeletal tree of a generic object purposefully for object interaction, and collision is detected on the basis of the skeletal trees. Therefore, simulation of object interaction and object deformation can be integrated into a unified framework through skeletal trees.

Further objects and advantages will become apparent from a consideration of the ensuing description and drawings.

SUMMARY

According to one aspect of the present invention, a method is disclosed to model and animate deformation of objects by directly using inherent properties of parametric representations.

The NURBS curve has many useful characteristics. These powerful and simple properties can be used to simulate dynamic processes such as movement of muscles. In-depth qualitative and quantitative analogies can be found between the modification of the NURBS curve and the muscle movement. This technique suggests two layers of connection. At a basic layer, modification of the NURBS curve can realistically simulate movement of muscles. At an advanced layer, complex deformation of objects can be described and simulated using inherent properties of parametric representations.

Modeling and animation in the present invention can be described by a hierarch. Firstly, control points of a NURBS curve determine the movement of points on the NURBS curve. Secondly, the points on the curve can affect vertices of a graphic model. Three-dimensional gradients can preferably be used in the association between points on the curve and polygonal vertices.

There are a number of sample points on a NURBS curve. A gradient is determined for each vertex on a polygonal model. Through the gradient of a vertex, a curve point is associated with the vertex. The association can preferably be based on the minimum distances from all the sample points of the curve to the gradient. After the association is built, movement of the vertex is affected by the point on the curve.

Parametric representations are constructed and associated with geometric models, while at the same time the properties are used to represent the underlying mechanism of deformation. This method includes the steps of building parametric representations on a geometric model, associating vertices of the model with different ones of the parametric representations to effect movement, and animating movement of the vertices to simulate relative motion.

Preferably, said properties are about repositioning control points or changing weights of the NURBS curve, and the method is used to model and animate complex objects. Preferably, said mechanism of deformation is the movement of multiple muscles, and the effects of their mutual influence of the muscles are simulated by said properties. Preferably, the method is used to model and animate facial expression, whereby the vertices in the topography of the surface are assigned to various portions of facial anatomy including muscles and wherein the parametrical representations are modified to differentiate the different portions of the facial anatomy. The weighting parameter or position of control points is preferably changed to simulate facial expressions.

Preferably, the parametric representations are NURBS curves and position of the control points of NURBS curves are predetermined by the location where simulated muscles are attached to facial bones. Each NURBS curve can simulate one or multiple muscles.

Preferably, the association of parametrical representations with a model is predetermined by distribution and movement of muscles. Preferably, fuzzy logic is used to determine the association of vertices with NURBS curves to simulate mutual influence and gradual transition of multiple muscles.

The deformation of individual objects and the interaction of multiple objects are closely related in real life, but are traditionally approached quite differently in graphic simulation. In this patent document, simulation of object interaction means the simulation of collision detection and response, and the deformation of individual objects alone is not considered as object interaction.

To bring the simulation of object deformation and object interaction into a unified framework, the present invention uses a common set of tools that can be used in simulating the two procedures.

The present invention builds a skeletal tree of a generic object purposefully for object interaction, and collision is detected on the basis of the skeletal trees. A skeletal tree is a simplified representation of an object and shall be useful in deforming an object and simulating interaction of objects. The present invention represents an object with a skeletal tree and volumetric entities associated with tree-nodes. Therefore, simulation of object interaction and object deformation can be integrated into a unified framework through skeletal trees.

A method is disclosed that preprocesses a graphic object and segments the object into a number of contexts at surface slope and curvature discontinuities. Then, control points are generated to represent these contexts. Based on these control points, a skeletal tree of the object can be built. Assisted by spatial decomposition, the skeletal trees can be directly used in the simulation of object interaction.

The control points can preferably be generated by using fuzzy sets. Simulation of object interaction can preferably be assisted by concurrent computing.

DRAWINGS

Figures

FIG. 1A and FIG. 1B show two properties about modification of the NURBS curve that are related to the present invention.

FIG. 2 shows a hierarch that describes the modification of geometric models using the NURBS curve.

DESCRIPTION OF THE PREFERRED EMBODIMENT

Figure 3:
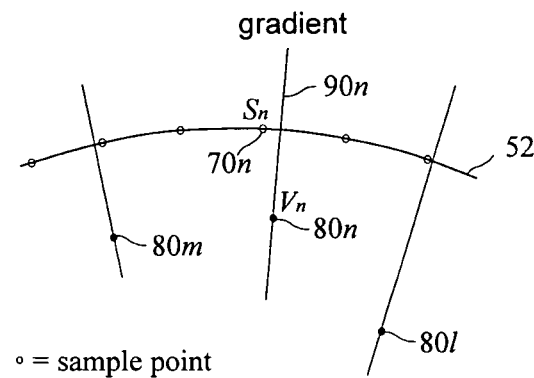
FIG. 3 illustrates the nature of gradients in FIG. 2.

Portions of the disclosure of this patent document contain material which is subject to copyright protection.

The following specification describes the application of the invention in computer facial animation. But the invention is not limited to computer facial animation, which will become apparent from a consideration of the ensuing description and drawings.

Non-Uniform Rational B-Spline (NURBS) curve is a general and flexible parametric curves. A NURBS curve is represented in a mathematic form as a function of parameter u:

$$C(u) = \frac{\sum_{i=0}^{n} N_{i,p}(u)\omega_i P_i}{\sum_{i=0}^{n} N_{i,p}(u)\omega_i} \quad u \in [a, b], \quad (1)$$

where $\{P_i\}$ are control points, $\{w_i\}$ are weights of the control points, and $\{N_{i,p}(u)\}$ are B-spline basis functions which are defined on a sequence of non-decreasing knots $\{u_i\}$ such that $a \leq u_i \leq u_{i+1} \leq b$. Connection of consecutive control points forms a control polygon. The NURBS curve is determined by its control points and associated weights. The NURBS curve is explained in detail by Piegl and Tiller in "The NURBS Book (2nd ed.)", and many others.

The NURBS curve has many useful characteristics. FIG. 1A and FIG. 1B show two properties about modification of the NURBS curve. In FIG. 1A, a NURBS curve 50a is determined by a number of control points. When a control point $P_i$ 60a is moved to a new position P; 60a', any affected point C($\bar{u}$) on curve 50a will move in a direction parallel to the movement of $P_i$ 60a. In the specification, $\bar{u}$ represents a specific value of parameter u. In FIG. 1B, when a weight $w_i$ of a control point 60b is changed, any affected point C($\bar{u}$) on the curve 50b will move along a straight line passing through the control point 60b and the original point C($\bar{u}$). Increasing $w_i$ pulls C($\bar{u}$) towards 60b, and vice versa. Another property of the NURBS curve that is relevant to this invention is that modification of a control point only affects a local section of the curve.

These powerful and simple properties can be used to simulate dynamic processes such as movement of muscles. The modification illustrated in FIG. 1A and FIG. 1B can simulate the movement of a muscle. In FIG. 1A, if the control point 60a is moved along the movement direction of a muscle, all affected points on the curve will move in directions parallel to the movement of the muscle. In FIG. 1B, if the control point 60b approximates the location of a muscle end, contraction of the muscle can be simulated by increasing the weight $w_i$, which moves points on the curve towards the muscle end. More in-depth qualitative and quantitative analogies can be found between the modification of the NURBS curve and the muscle movement. For example, modification of a single control point only affects a local section of a NURBS curve. In addition, when the knots $\{u_i\}$ reflect the distribution of the control points, the closer a point on the curve is to a control point, the more substantially the modification of the control point affects the curve point. Therefore, movement of muscles can be realistically simulated by modifying the NURBS curve. Another benefit of this scenario is high-level control offered by control points, as illustrated in FIG. 1A and FIG. 1B.

A NURBS curve can be equivalent to an individual muscle or a group of muscles. Furthermore, changing the weights of different control points can simulate the movement of linear, sphincter, or sheet muscles. For example, a linear muscle can be simulated by changing the weight of one control point; while a sphincter or sheet muscle can be simulated by updating the weights of several neighboring control points. During animation, an individual vertex on the facial model can be affected by one or more NURBS curves, which is intuitively analogical to real facial movements.

Modeling and animation in the present invention can be described by a control hierarchy, which is shown in FIG. 2. Firstly, control points 60 of a NURBS curve control the movement of points 70 on the NURBS curve. Secondly, points 70 control vertices 80 of a graphic model. It is assumed that the object is represented by a polygonal model for simplicity. Three-dimensional gradients 90 can be used in the association between points on the curve and polygonal vertices.

FIG. 3 illustrates the nature of gradients in FIG. 2. There are a number of sample points on a NURBS curve 52. Points 80*l*, 80*m*, 80*n* represent vertices on a polygonal model. A gradient is determined for each vertex on a polygonal model. For example, a gradient 90*n* is determined for a vertex 80*n*. Through the gradient, a curve point $S_n$ 70*n* is associated with vertex $V_n$. The association can be based on the minimum 3D distances from all the sample points of curve 52 to gradient 90*n*. After the association is built, movement of the vertex $V_n$ 80*n* is affected by point $S_n$ 70*n* on the curve.

The basic elements of the hierarchy are control points of NURBS curves and gradients of polygonal vertices. NURBS curves can be constructed after control points are located, and points on curves can be associated with vertices after the gradients are determined.

Modeling and animation of a human face can be divided into three consecutive procedures: building of NURBS curves; association of the NURBS curves with a model; animation by modifying the NURBS curves.

Building of NURBS Curves

Figure 4A:
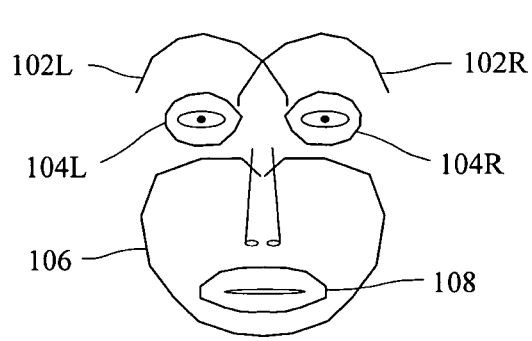
FIG. 4A and FIG. 4B illustrates the initial positions of control polygons of the NURBS curves.
Figure 4B:
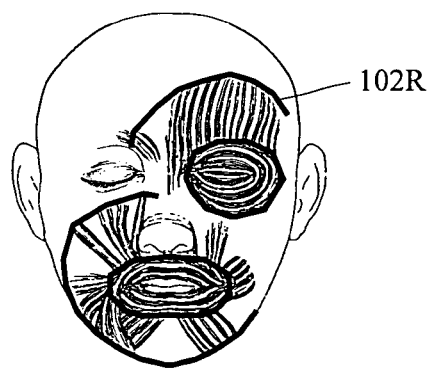

Because of the geometric analogy between curve modification and muscle movement, the control points of the NURBS curves may be positioned near the muscle ends attached to facial bones in the simulation model. When relevant muscles contract, the muscles are pulled toward these ends. FIG. 4A and FIG. 4B illustrate the initial positions of control polygons of the NURBS curves. There can be six NURBS curves 102L, 102R, 104L, 104R, 106 and 108, whose control polygons are shown in FIG. 4A. These curves can simulate most facial muscles that contribute to expressions. FIG. 4B shows some facial muscles on which the control points are embedded. As shown in FIG. 4B, a control polygon 102R have all its points near muscle ends, similarly for all other control polygons. Locations of muscle ends can be found in numerous books about anatomy, such as the book by Rosse and Gaddum-Rosse in "Hollinshead's Textbook of Anatomy, (Fifth edition)"

Figure 5:
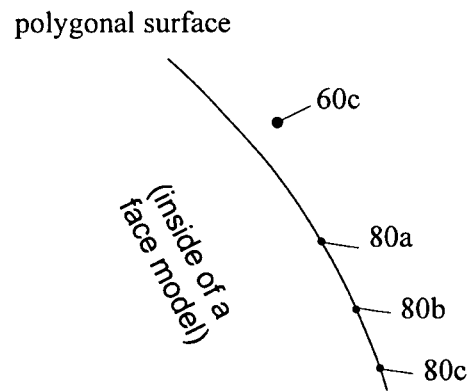
FIG. 5 illustrates side view of the positions of a control point.

If it is desirable for facial polygonal vertices to move approximately along the surface tangentially, the control points can be positioned slightly above the surface of a face model. FIG. 5 illustrates a side view of such preferable positions of a control point. Vertices 80*a*, 80*b* and 80*c* are on a polygonal surface, and a control point 60*c* is slightly above the surface.

Cubic curves (p=3 in Equation (1)) are used in face modeling since they offer shape flexibility and also avoid unwanted oscillations. To reflect the geometric distribution of the control points, chord length parametrization (details described in Piegl and Tiller's book) is used to determine knots of the NURBS curves. That is, the knot spacing of $\{u_i\}$ is proportional to the distances between the control points. Since the distribution of control points is considered, a control point can more substantially influence a closer curve section.

The weights $\{w_i\}$ of the NURBS curve are set to 1 when the NURBS curve is initially constructed. Thus, the influence of each control point to the curve is equal.

After the elements of a NURBS curve (control points, weights and knots) are determined, the NURBS curves can be calculated. The book by Piegl and Tiller includes complete algorithms for determining the NURBS curve. Industry standards also exist for the NURBS curve. Alternatively, the following C++ code can be used to generate a section of a cubic NURBS curve (the following code can be run on PC using Microsoft Visual C++):

```
int f1 = pskv – p; // pskv — current position in knot vector; p — degree of NURBS curve (3 for cubic)
int s2 = f1 + 1;
int t3 = s2 + 1;
int f4 = t3 + 1;
double numerator_x, numerator_y, numerator_z, denominator, x, y, z;
double sec1, sec2, sec3, sec4;
// array v[] holds the knot vector, array weight[] holds the weights of control points
while (u < v[pskv+1])
{
    sec1 = weight[f1]* pow(v[s2+p]–u, 3.)/((v[s2+p]–v[s2])*(v[s2+p]–v[t3])*(v[s2+p]–v[f4]));
    sec2 = weight[s2]*((u – v[s2])* pow(v[s2+p] – u, 2.)/((v[s2+p]–v[s2])*(v[s2+p]–v[t3])*(v[s2+p]–v[f4])) + (v[t3+p]–u)/(v[t3+p] – v[t3])*((u – v[t3])*(v[s2+p] – u)/((v[s2+p] – v[t3])*(v[s2+p] – v[f4])) + (v[t3+p] – u)*(u – v[f4])/((v[t3+p] – v[f4])*(v[s2+p] – v[f4]))));
    sec3 = weight[t3]*((u – v[t3])/((v[t3+p] – v[t3])*(v[s2+p] – v[f4]))*((u –v[t3])*(v[s2+p] –u)/(v[s2+p]–v[t3]) + (v[t3+p] – u)*(u – v[f4])/(v[t3+p] – v[f4])) + (v[f4+p] – u)* pow(u – v[f4], 2.)/((v[f4+p] – v[f4])*(v[t3+p] – v[f4])*(v[s2+p] – v[f4])));
    sec4 = weight[f4]* pow(u – v[f4], 3.)/((v[f4+p] – v[f4])*(v[t3+p] – v[f4])*(v[s2+p] – v[f4]));
    denominator = sec1 + sec2 + sec3 + sec4;
    if( denominator == 0.0)
    {
        cout << "Divided by zero.\n" >> endl;
        exit (–1);
    }
    // array ctrpt[] holds the coordinates of control points of the NURBS curve,
    // each element in ctrpt[] is a point object
    numerator_x = ctrpt[f1].x*sec1 +ctrpt[s2].x*sec2 + ctrpt[t3].x*sec3 + ctrpt[f4].x*sec4;
    x = numerator_x /denominator ;
    numerator_y = ctrpt[f1].y*sec1 +ctrpt[s2].y*sec2 + ctrpt[t3].y*sec3 + ctrpt[f4].y*sec4;
    y = numerator_y /denominator ;
    numerator_z = ctrpt[f1].z*sec1 +ctrpt[s2].z*sec2 + ctrpt[t3].z*sec3 + ctrpt[f4].z*sec4;
    z = numerator_z /denominator ;
    // array curvept[] holds the sample points of the NURBS curve
    // constructor of point object takes three coordinates
    curvept[cpcnt] = point (x, y, z);
```

```
u += intv; // increase u a fixed interval
}
```

For each NURBS curve, there is not necessarily a one-to-one relationship between the control points and the muscles. Due to the localness of the NURBS curve, the effect of a local muscle can also be simulated by several control points, and vice versa.

Association of the NURBS Curves with a Model

Figure 6:
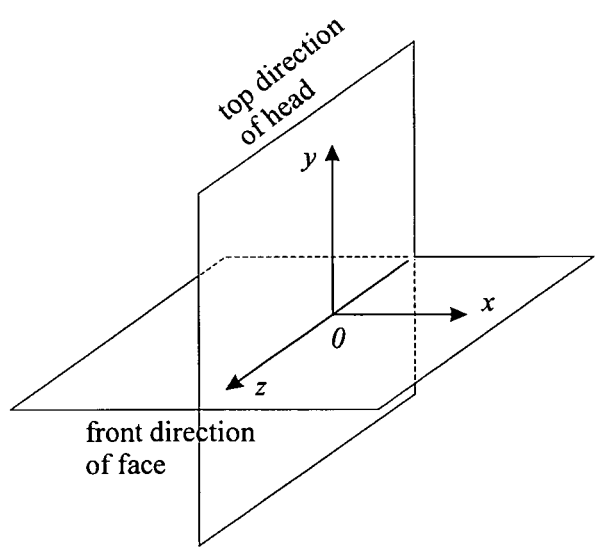
FIG. 6 illustrates the coordinate system used in this specification.

A generic face model can be presented by a polygonal mesh and each polygonal vertex has a set of coordinates (x, y, z) to represent its location in 3D space. FIG. 6 illustrates the coordinate system. The origin of the coordinate system is located at the centre of a virtual head model.

Figure 7:
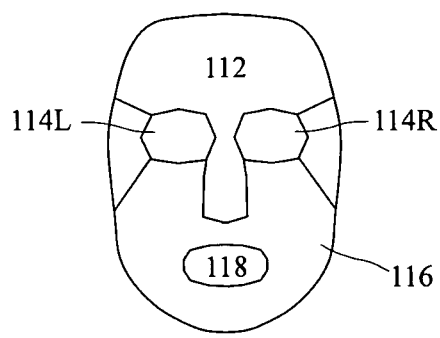
FIG. 7 shows the approximate locations of areas on a facial model.

The surface of a face model is separated into a number of areas. FIG. 7 shows the approximate locations of these areas. The polygonal vertices on the face model are separated into two primary areas (or top-level units) of the mouth and eyes, since the eyes and the mouth are the most important parts in expressions. Each primary area has two sub-areas (or sub-units), as follows:

1) Vertices where muscles affect the eyes. They are further divided into
   a) Vertices on the forehead 112;
   b) Vertices on the eyes 114L and 114R.
2) Vertices where muscles affect the mouth. They are further divided into
   a) Vertices on the cheeks and jaw 116;
   b) Vertices on the mouth 118.

To realistically simulate the mutual influence of facial areas, the sub-areas within the two primary areas are considered as fuzzy sets. Techniques for fuzzy sets are described in many books, including a book by Yen and Langari in "Fuzzy Logic: intelligence, control, and information". That is, a vertex near the boundaries of two sub-areas may have membership values to the two sub-areas, so the movement of the vertex may be controlled by both sub-areas. The control polygons of the NURBS curves can also act as boundaries between units.

Figure 8:
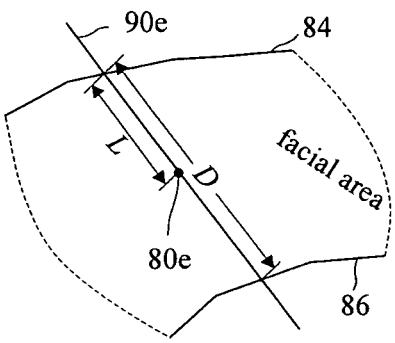
FIG. 8 illustrates an example of membership determination of a vertex to an area.

The membership of a vertex to an area is determined by the vertex's position in the area. FIG. 8 shows an example. In FIG. 8, a vertex's position is compared with a preset membership function of an area. That is, the membership of vertex 80e to the area is a function of a relative value $$\mu(L/D) \qquad (2)$$

where L is the distance of a vertex 80e to one boundary 84, and D is the distance between two boundaries 84 and 86 of the area. Distances L and D are indicated by double-arrow line in FIG. 8. L and D can preferably have the same directions, such as vertical (to x-z plane) or preferably along a gradient 90e of vertex 80e. Both L and D can preferably be measured at the location of vertex 80e.

The membership function of a fuzzy set can have a normal trapezoidal or triangular shape. Refer to the book by Yen and Langari for membership function and determining membership of an element.

Based on the muscle(s) each NURBS curve simulates, an area on the face model can be controlled by a NURBS curve, and Table 1 shows the control relationship between curves (whose control polygons are shown in FIG. 4A) and facial areas (shown in FIG. 7). However, since a single vertex can have membership of more than one area, a vertex may thus be affected by more than one curve.

TABLE 1

Association of areas with NURBS curves

| Facial Area | Area Code | Side | Connected Curve |
|---|---|---|---|
| forehead | 112 | left | 102L |
|  |  | right | 102R |
| eyes | 114L | left | 104L |
|  | 114R | right | 104R |
| cheek & jaw | 116 |  | 106 |
| mouth | 118 |  | 108 |

FIG. 3 illustrates that a vertex can be associated with a curve point through a gradient of the vertex. To realistically simulate a human face, the gradients can preferably simulate movement directions of muscles. For any vertex $V_n$, its gradient can connect $V_n$ and a feature points located at a geometrically neutral point, such as the centroid of the mouth or an eye. The reason is that the muscles usually have movement radial to these neutral points. The preferable method for determining the gradients found by the inventor is described as follows.

Figure 9:
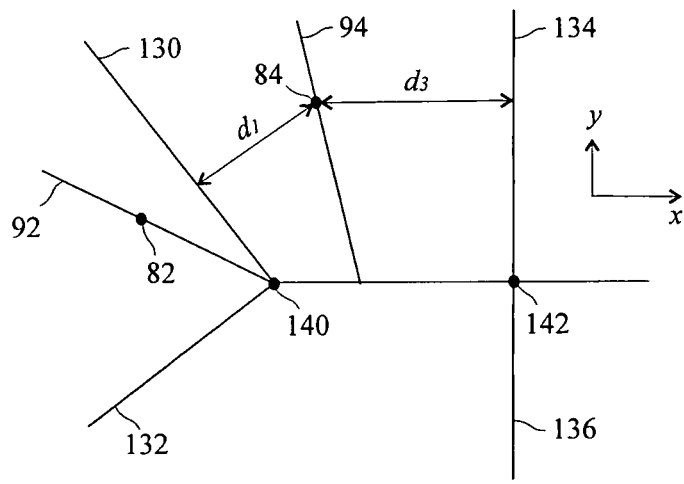
FIG. 9 shows the determination of gradients for vertices around the mouth.

The distribution of muscles around the mouth is more complex than around the eyes. The orbicularis oris, which circles the mouth, is the location of insertion for many other muscles. Some of these muscles insert into the corner of the mouth, while others insert into the upper and lower lips. The gradients on the mouth area will closely simulate this distribution, and can be interpolated from a small number of preset gradients. FIG. 9 shows the determination of gradients for vertices around the mouth. Gradients 130, 132, 134, 136 are preset vectors which resembles the contraction directions of muscles. There vectors may be determined on the basis of anatomy described at the beginning of this paragraph. Feature points 140, 142 represent a corner and the center of the mouth, respectively. All the vertices in the area between 130 and 132 will have a gradient passing through feature point 140, and all the vertices in the area between gradients 130 and 134 (or 132 and 136) will have a gradient intepolated from gradients 130 and 134 (or 132 and 136). Therefore, the gradient passing through any vertex on the mouth area can approximate the contraction direction of a muscle. The position directions of x and y axe are indicted as arrows.

Polygonal vertices 82 and 84 are two vertices at the left side of the mouth area. First, connect the vertex (82 or 84) and feature point 140, the 2D angle (on the x-y plane) between this connection and the positive x-axis is calculated. If this angle is between those of gradients 130 and 132 with the positive x-axis, then the original connection remains as gradient 92. Otherwise, a new weighted gradient $G_2$ will be determined in 3D space. For vertex 84 which is at the area between gradients 130 and 134, a new gradient is determined as $$\frac{d_3}{d_1 + d_3} L_{grad1} + \frac{d_1}{d_1 + d_3} L_{grad3}, \qquad (3)$$

where $d_1$ and $d_3$ are distances of vertex 84 to gradients 130 and 134, $L_{grad1}$ and $L_{grad3}$ are 3D gradients of gradients 130 and 134, respectively.

Gradients can be vertical (to x-z plane) for vertices affected by Curve 104L, 104R and 108 (control polygons shown in FIG. 4A) which simulate sphincter muscles, and for those affected by Curve 102L and 102R which simulate sheet muscles. This is because these muscles have the predominant contraction direction of up-down movement. Intuitively, the vertices on the upper part of the eyes or the mouth will be connected with sample points on the upper section of the closed NURBS curve, vice versa for the vertices on the lower part. This association can be assisted by feature points located at geometrically neutral points, such as the centroids of the mouth and eyes. A vertex (such as 80n in FIG. 3) and its associated curve point (such as 70n in FIG. 3) may be needed to located at the same side of a feature point.

Animation of Facial Expressions by Modifying the NURBS Curves

The NURBS curve can be modified by changing weights. Based on anatomical knowledge of the muscle movement, parameters can be interactively set into arrays. Firstly, weights are qualitatively modified to approximate the underlying muscle movement of these elementary activities. Secondly, the quantitative values of weights are set interactively to make the face model generate a desired expression.

For example, in generating happiness expression, a muscle near the ear pulls the mouth outwards and upwards. To simulate this effect, control points of Curve 106 (whose control polygon shown on FIG. 4A) that are near the ear are shifted outward and upward, or their weights are increased. In generating sadness expression, a muscle located at the lower-outer sides of the mouth contracts and pulls the mouth corners downwards. To simulate this effect, control points of Curve 106 that are located at the lower-outer sides of the mouth are moved outward from the mouth, or their weights are increased.

Since a NURBS curve can represent a group of muscles, changing different weights can simulate movement of the different muscles. For example, the NURBS curve on one side of the forehead has several control points (102L or 102R). Increasing the weights of the middle control points can simulate the contracting of the frontalis, i.e. the brow lifting muscle; increasing the weight of the control point roughly situated between the eyes can simulate the contracting of the corrugator, i.e. the frown muscle.

Figure 10:
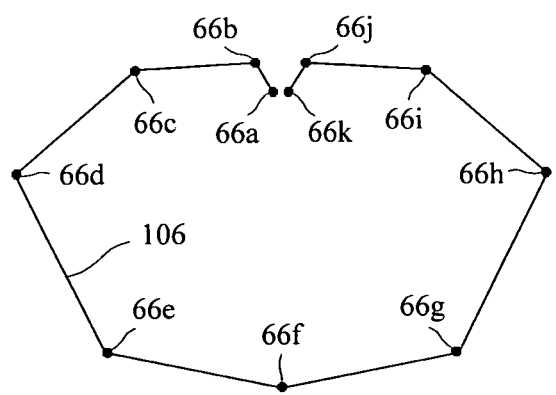
FIG. 10 shows the control polygon of a NURBS curve projected on a two-dimensional plane.
Figure 11:
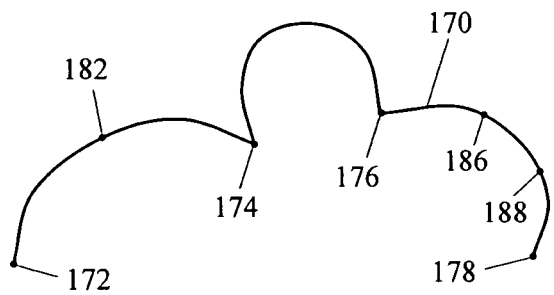
FIG. 11 illustrates an example of boundary segmentation.

Table 2 presents the weight assignment of Curve 106 in representing the most forceful positions of primary expressions. FIG. 10 shows the control polygon of Curve 106 projected on the x-y plane, and the general position of Curve 106 on the virtual face model has been illustrated in FIG. 4A. A consideration of the specification can show that the parameters in Table 2 primarily represent modification of control points, since other parameters (e.g. those in Equations (1) to (6)) and exact locations of control points will affect those parameters. As stated previously, there is not necessarily a one-to-one relationship between the control points and the muscles, therefore, the number of control points of Curve 106 may also vary, instead of 11 control points as illustrated in FIG. 11 and Table 2. Parameters in Table 2 are symmetrically set for simplicity in this patent document, but they can also be set asymmetrically.

The present invention allows modification of a model to be quantitatively controlled by parametric representations that are associated with the model, as shown in Table 2.

TABLE 2

Weights of Curve 106 in representing most forceful expressions

| Control Point | 66a | 66b | 66c | 66d | 66e | 66f | 66g | 66h | 66i | 66j | 66k |
|---|---|---|---|---|---|---|---|---|---|---|---|
| anger | 1 | 1.2 | 2 | 1 | 1 | 1 | 1 | 1 | 2 | 1.2 | 1 |
| disgust | 1 | 1.5 | 1.6 | 1 | 1 | 1 | 1 | 1 | 1.1 | 1.1 | 1 |
| fear | 1 | 1 | 1 | 1.3 | 1.1 | 1 | 1.1 | 1.3 | 1 | 1 | 1 |
| happiness | 1 | 1 | 1.4 | 1.6 | 1 | 1 | 1 | 1.6 | 1.4 | 1 | 1 |
| sadness | 1 | 1 | 1 | 1 | 1.2 | 1 | 1.2 | 1 | 1 | 1 | 1 |
| surprise | 1 | 1 | 1 | 1 | 1.1 | 1 | 1.1 | 1 | 1 | 1 | 1 |

To simulate an arbitrary primary expression, information of its elementary movement is fetched from the arrays. To generate the expression, movements of the curves are linearly interpolated. It is possible to modify the curves directly by using weights as variables, but the drawback of this approach is that the weights need to be changed exponentially in order to generate linear curve movements.

After the NURBS curve are modified, polygonal vertices will then move with NURBS curves as the follows:

$$\overrightarrow{VV'} = \sum_j r_j \overrightarrow{S_j S'_j}, \quad (5)$$

where $S_j$ is a sample point on a NURBS curve associated with a vertex V; $S'_j$ is the new position of $S_j$ after the curve is modified; and V' is the updated position of V. Movement of V is a sum of vectors since it can be affected by a number of NURBS curves. $r_j$ is a scalar ratio between V and $S_j$, and $r_j$ can be decided by the membership of V, e.g.

$$r = k \cdot \sin\left(\mu \cdot \frac{\pi}{2}\right) \quad (6)$$

where $\mu$ is the membership ($0 \leq \mu \leq 1$) of a vertex V; k is a constant with the effect of a spring constant. The sine function is used to smooth and constrain the movement of vertices. The reason is that the larger the membership, the more the vertex should be affected by a curve, which simulate a muscle in the area.

Portions of the disclosure of this patent document contain material which is subject to copyright protection.

To use a skeletal tree in collision detection, the skeletal tree needs to represent the boundary of an object faithfully since collisions occur on the boundaries of objects. This special circumstance is dramatically different from prior art techniques, which are primarily concerned with internal properties (e.g. symmetry). Another concern is quick buildup time of skeletal trees, since ultimately object deformation and object interaction need to be simulated simultaneously. Thus, buildup time of skeletal trees may need to match the deformation of objects.

A method is disclosed that preprocesses a graphic object and segments the object into a number of contexts at surface slope and curvature discontinuities. Then, control points are generated to represent these contexts. Based on these control points, a skeletal tree of the object can be built. Assisted by spatial decomposition, the skeletal trees can be directly used in the simulation of object interaction.

Simulation of object interaction and deformation can be divided into three consecutive procedures: boundary segmentation, skeletal tree generation, and simulation of object interactions.

Boundary Segmentation

A context in this specification means a surface segment that exhibits a high level of uniformity, that is, a continuous surface patch with a gradually changing tangent. Context-based segmentation has been used in some computer graphics applications, such as context-sensitive normal estimation. The discussion in this specification mostly focuses on simple 2D objects without holes. However, the basic principle can apply to complicated 3D objects with holes.

The process of boundary segmentation is described as follows:

(1) Segmentation of object boundary into contexts at discontinuities, which include
  (a) edge detection,
  (b) curvature discontinuity detection;
(2) Re-segmentation for balanced representation;
(3) Subdivision within contexts for fine-grained representation.

The boundary of an object is segmented into a number of contexts at discontinuities. There are many prior art techniques that can implement these operations. For example, edge detection can be accomplished by using difference operators, such as gradient or Laplacian. Omnidirectional tracking can be used for edge tracking. Curvature discontinuity can be detected by measuring the k-curvature and change in k-slope while an edge is being tracked. Discontinuities can be the locations where both the k-curvature and change in the k-slope are larger than some threshold values. The threshold values and k are application dependent. The algorithms of tracing a contour can be found in a prior art technique described by Pavlidis in "Algorithms for Graphics and Image Processing". The algorithms of measuring slopes and curvatures can be found in a prior art technique described by Rosenfeld and Kak in "Digital Picture Processing". The concept of the slope and curvature are also explained in detail in their books.

FIG. 11 illustrates an example, where discontinuities of an object boundary 170 are detected at points 172, 174, 176 and 178.

Afterwards, the surface of an object will be partitioned into different contexts at discontinuities. Data structures can represent the edge and discontinuity locations. For example, a linked list can contain coordinates of edge points and another linked list can hold the indices of the discontinuities to the first linked list.

To have a balanced representation, the boundary is re-segmented. During the re-segmentation operation, first, dimensions of different contexts are compared and a standard dimension can be chosen. The dimension of a context can be the distance between its two endpoints. Then the standard dimension is used as a parameter to re-segment contexts, e.g. contexts whose dimensions are much smaller than the standard dimension are merged into neighboring contexts, and contexts whose dimensions are much bigger than the standard dimension are re-segmented into a number of contexts. A context whose endpoints have a curvature and a change in slope larger than some threshold values, will not be merged into its neighboring context. For example, the context from point 172 to point 174 is re-segmented at points 182, thus becomes two contexts.

To have a fine-grained representation of the boundary, some contexts are subdivided. A context is further divided according to certain criteria. These criteria can be a certain distance from, or an average rotation relative to context endpoints or neighboring subdivision locations, or a certain number of subdivisions within the context. For example, the context between point 176 to point 178 is subdivided at points 186 and 188. A context whose dimension is smaller than a global threshold may not be subdivided.

The purpose of re-segmentation and sub-division within contexts is to provide a balanced and fine grained structure to other operations in the processing pipeline, i.e. skeletal tree generation and interaction simulation. Thus, re-segmentation and sub-division can preferably based on some global criteria, e.g. the thresholds can be set globally for one object.

The final output of boundary segmentation can include data structures representing subdivided contexts, e.g. a linked list whose elements are arrays and each array holds indices of context end-points and subdivision locations of one context. The indices are equivalent to pointers to elements in the linked list that holds boundary points.

For an object with holes, the external and inner contours can separately go through the operations. Then by connecting between context level segmentation locations of external and inner contours, the object will be partitioned into a number of patches, which can be considered as contexts. For complex 3D objects, the labeling of discontinuities can be a by-product of voxelization algorithms (Yagel et al). For volumetric objects that lack explicit surfaces, the objects can be preprocessed to construct surface representations (Gibson 98).

Another benefit of context-based segmentation is the surface normal can be represented economically. Since within one context, the surface normal only changes gradually. The surface normal is useful for simulation of physical interaction, such as haptic interfaces.

Skeletal Tree Generation

In a mathematical definition, the skeleton of a shape is the locus of the symmetric points of the local symmetries of the shape. The skeletal tree used in this specification does not fit strictly within this mathematical definition; the skeletal tree is more closely related to the skeletal structure used in computer animation. The aim of utilizing a skeletal tree in the present invention is to facilitate fast animation, interaction simulation, such as collision detection and response. Generation of control points for the skeletal tree can have two phases. At the first phase, fuzzy logic and rule-based reasoning is utilized to generate control points at low levels of the skeletal tree, making these control points representative for contexts or subdivisions within related contexts. At the second phase, control points at the high levels of the skeletal tree can be positioned interactively by an animator, or using skeletonization methods on the basis of simplified object representation, such as object discontinuities. Control points refer to tree nodes of the skeletal tree.

Fuzzy systems combine one or more input variables, defined in terms of fuzzy sets, with a collection of fuzzy rules to produce an output value. An important reason of using fuzzy rules is that fuzzy rules can be intuitively set and the system can execute in real time.

Figure 12:
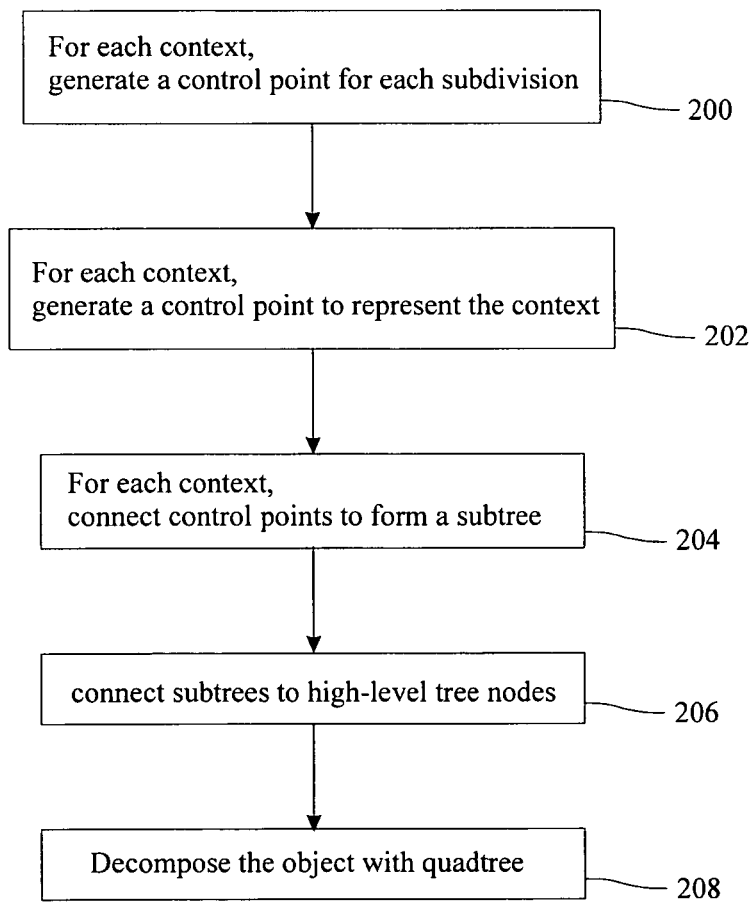
FIG. 12 is a flowchart illustrating the steps in generating a skeletal tree.
Figure 13A:
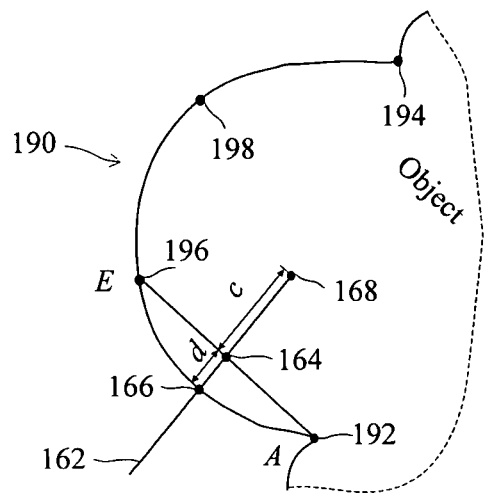
FIG. 13A to FIG. 13C illustrate generation of control points and forming of a subtree.
Figure 13B:
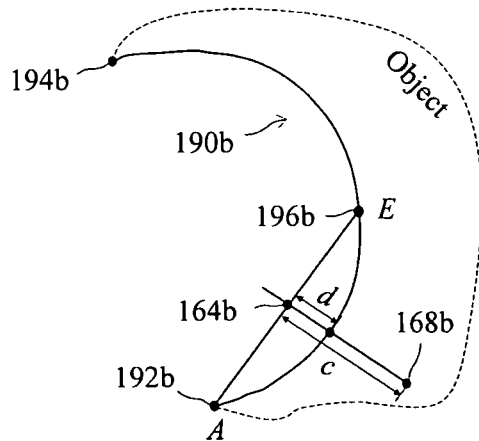

FIG. 12 is the flowchart illustrating the steps in generating a skeletal tree. In a block 200, a control point is generated for each subdivision in a context. Refer to FIG. 13A and FIG. 13B for details for the implementation of block 200.

In FIG. 13A, suppose a convex surface between boundary points 192 and 194 is segmented as a context 190 by using the method described previously, and the context is further subdivided at points 196 and 198. Connect two end points 192 and 196 of a subdivision, and the middle point of the connection (denoted as AE) is point 164. A line 162 that is perpendicular to AE and passes point 164 meets context 190 at point 166. The distance between the boundary point 166 and middle point 164 of AE is denoted as d, which is represented as a double-arrow line. Since context 190 is convex in FIG. 13A, d is defined as positive. A point 168 is the control point representing the subdivision between points 192 and 196. Point 168 is a point on line 162, and the method of locating point 168 is described shortly. The distance between the middle point 164 of AE and the control point 168 is denoted as c, which is represented as a double-arrow line.

In FIG. 13B, a non-convex surface between boundary points 192b and 194b is segmented as a context 190b, and a section of context 190b between points 192b and 196b is a subdivision. Point 164b is the middle point of the connection between points 192b and 196b. A point 168b is the control point representing the subdivision between points 192b and 196b. Distances d and c are denoted similarly as in FIG. 13A. Since context 190b is non-convex in FIG. 13B, point 164b is outside the object boundary, thus d is defined as negative. In both FIG. 13A and FIG. 13B, the sign of distance c indicates if c and d lie on the same side of the line segment AE. Positive means c and d are at the same side, vice versa. The following fuzzy rules can be used to determine the location of the control points (a) If d is positive large, then c is negative small.
    (b) If d is positive small, then c is negative large.
    (c) If d is zero, then c is large within the object.
    (d) If d is negative small, then c is positive large (+|d|).
    (e) If d is negative large, then c is positive small (+|d|).

In rules (a) to (e), large or small is relative to the distance AE. The terms in above rules are standard terminology in fuzzy logic. Techniques for fuzzy logic are described in many books, including a book by Yen and Langari in "Fuzzy Logic: intelligence, control, and information".

In a block 202, a control point is generated for each context. The determination of a context-level control point is similar to generating a control point for a subdivision. The context level control points can be located on the basis of context endpoints (such as points 192 and 194). For a non-convex context, a control point can be mirrored inside the object, using the method as disclosed in FIG. 13B.

Figure 13C:
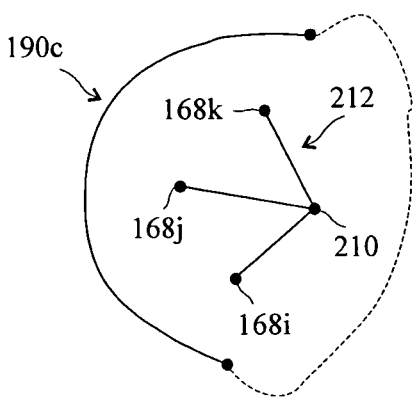

In a block 204, control points of a context are connected to form a subtree. Refer to FIG. 13C for details in block 204. In FIG. 13C, points 168i, 168j, 168k are control points that represent subdivisions of a context 190c. Point 210 is a control point that represents context 190c. A subtree 212 is generated by connecting control point 210 with control points 168i, 168j, 168k, respectively. The connection is achieved by registering with point 210 the pointers to points 168i, 168j, 168k. Subtrees such as 212 are at the lowest level of the skeletal tree, and probably isolated from each other. All nodes in these subtrees should be associated with coordinates of the control points. The purpose of this association is to speed up interaction simulation as discussed in the following description.

Between blocks 204a and 206, control points may optionally be post-processed to ensure global centreness of the control points. To make the control points central to both a context and the whole object, the threshold values during segmentation can preferably be set conservatively, and context-level control points may be merged and moved. Merging and moving context-level control points can be manually accomplished by an animator or by using computational intelligence techniques, e.g. fuzzy logic. For example, a fuzzy rule can be set for control point merging as: If two context-level control points are too close and their connection doesn't cross a boundary, they will merger into one. After merging and moving, the connections between the control points of the contexts and those related subdivisions should be retained and their coordinates updated.

In a block 206, subtrees are connected to high-level tree nodes. A animator can manually set some tree nodes at high levels of the skeletal tree. The final animation or deformation will determine the setting of the tree nodes at this phase. Some known skeletonization methods may also generate tree nodes at higher levels of the skeletal tree. These skeletonization techniques can use simplified representations of objects, e.g. discontinuities between contexts or context-level control points. For simulating collision detection, the centroid of an object can be effectively used as the root of its skeletal tree, and connected directly with context-level control points. Thus, division between the two phases, i.e. automatic and manual setting of tree nodes can be inherently fuzzy and application dependent.

In a block 208, a quadtree (octree for 3D) is used to represent the object for space efficiency. This operation may be processed concurrently with all the others in FIG. 12. Since a quadtree is generated recursively and the terminating conditions can be conveniently controlled, subdivision of the quadtree can terminate when each terminal quadtree node contains only one terminal skeletal tree node, thus associating the quadtree node with the skeletal tree node. Alternatively, the association can be dynamically processed during interaction simulation, which is described shortly.

However, the skeletal tree is the primary structure that is used in object interaction, and the quadtree is only a secondary structure for the purpose of space efficiency. That is, the quadtree is only used to represent the areas of an object associated with the tree nodes of the skeletal tree. Therefore, a Voronoi region may also be built around and associated with each each tree node of a skeletal tree. Techniques of determining Voronoi regions are described in many books, such as one by Berg et al in "Computational Geometry: Algorithms and Applications".

Simulation of Object Interaction

Based on the data structures which have been built to represent objects, concurrent computing can be exploited to assist realistic and real time simulation. Multithreads can be implemented for concurrent computing. There can be two types of threads. One type runs at a general level, which roughly tests if objects will collide. The other type runs at a detailed level, which accurately checks the interactions of objects. A general level thread can spawn a detailed level thread whenever necessary.

Figure 14:
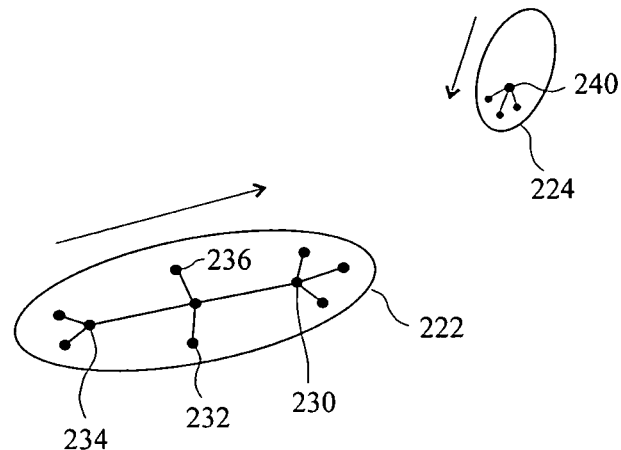
FIG. 14 shows a simple example of detecting collision between two oval objects.

FIG. 14 shows a simple example in which a scene is made up of two oval objects. If multiple objects are involved, the scheduling scheme of multiple objects (such as Lin and Gottschalk 95) may be used for primary scheduling. Objects 222 and 224 are individually modeled in their local coordinate system. Suppose skeletal trees have been set up for them respectively, as roughly shown in object 222. In object 222, points 230, 232, 234 and 236 are control points at context-level. In object 224, point 240 is a control point at context-level. Objects 222 and 224 are moving individually in different directions, as indicated by arrows. In the course of their movement, their control points are queried by a general level thread to check if there will be a collision. The general level thread can map variables in individual local coordinate systems to a world coordinate system, and take account of object orientation, relative moving directions. A search can be initialized from the root of a skeletal tree, towards those control points that are closer to another object in space. If the general level thread conservatively determines, that the contexts where one pair of control points (e.g. 230 in object 222 and 240 in object 242) are situated, may collide at some time, then a new detailed level thread can be spawned to carry out accurate detection, and pass the pair of control points to this detailed level thread.

The hierarchical depth in the skeletal tree where a general level thread spawns a detailed level thread can vary. Depending on the objects and the task-sharing requirements, it can be a user defined tree node, or a context-level control point, or a subdivision level control point. For context-level tree nodes, the triggering condition for detailed level threads can be that, if the distance between the control points is less than a times the sum of the context dimensions, where the control points are situated. The context dimensions have been calculated during the segmentation process. a may be set to 1.5, based on the inventor's experiment.

The detailed level thread can use either a passive or an active method to detect collision. In a passive method, for each skeletal tree node (such as 230 and 240), from its coordinates, the quadtree node which contains the skeletal tree node can be found, by recursively searching down the quadtree. The passive method can then translate the positions of terminal quadtree nodes branched from the nodes just determined to a world coordinate system and check if there is any overlay (collision). If the terminal nodes of quadtrees (octrees), which are being checked, have only been subdivided into larger dimensions (length, height and width), they can be further subdivided by the detailed level thread at run time. The detailed level thread can also take advantage of relative positions of objects, distribution of control points in space, as well as object moving directions, to focus on a limited number of nodes in objects, thus limiting the cost of computing resources. In an active method, wave fronts resembling context surfaces can be present along the objects' movement directions, again in a world coordinate system, thus predicting contact point and time. The wave fronts can be constructed as parametric surfaces (such as spline surfaces) if available, or they can use the node comparison approach as in the passive method. The prediction of a collision position and time can be useful for some applications, e.g. cutting of a graphic object. The prediction can allow time for skeletal tree reorganization, which may enable a timely generation of proper visual effects, e.g. an internal structure at a proper location after cutting.

Event driven methods can be used in general level and detailed level threads to speed up processing. For example, if one of the objects changes movement direction, this event can generate messages to threads. The detailed level thread will probably not detect a collision any more and terminate if a certain conservative condition is satisfied; the general level thread may spawn another detailed level thread, and pass another pair of control points. The terminating condition for detailed-level threads can be a minimum distance similar to that of the triggering condition, or a number of consecutive steps for the objects to leave each other.

The usage of multithreads in the embodiments of the present invention is to increase responsiveness and efficiently use system resources. Since for a graphical application, its main tasks may be physical simulation and/or graphical rendering, multithreads may achieve interaction modeling without conflicting with the main tasks. Another benefit of responsiveness is detecting multiple contacts between objects.

Figure 15:
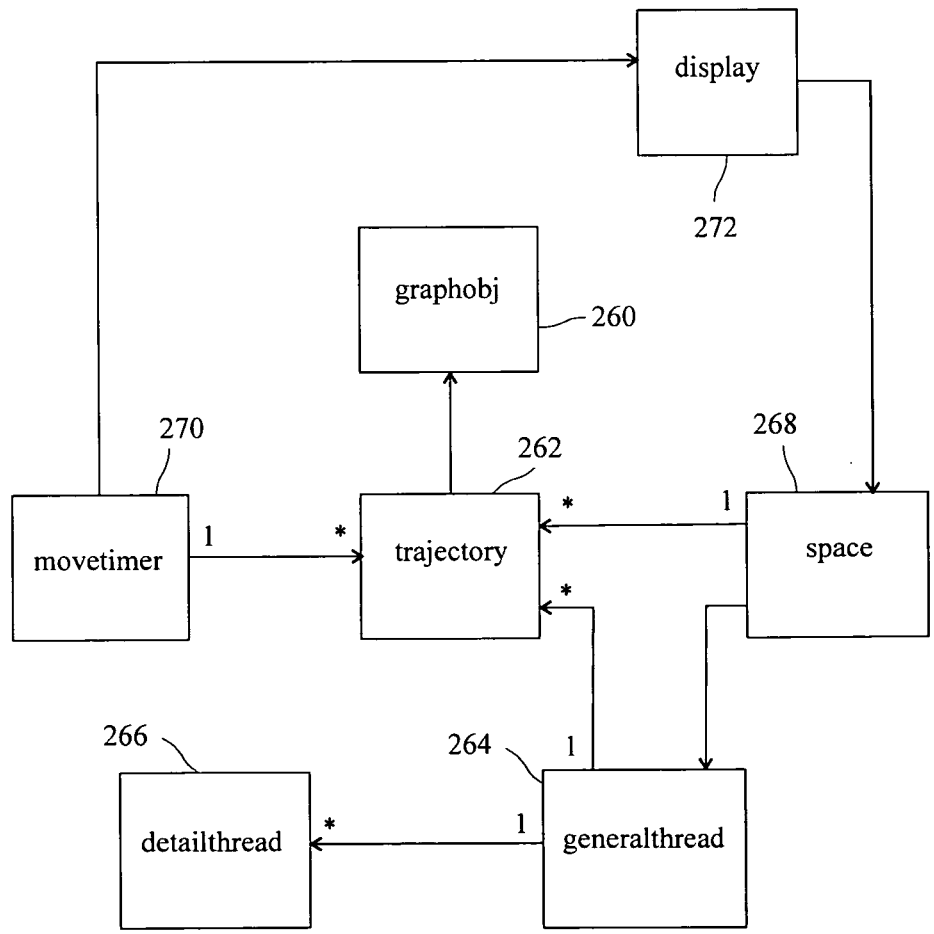
FIG. 15 is a class diagram of an embodiment that implements simulation in the present invention.

FIG. 15 shows a class diagram of an embodiment that implements simulation in the present invention in Unified Modeling Language (UML) semantics. The use of Java Language is assumed in this class diagram. In FIG. 15, relationship of classes 260, 262, 264, 266, 268, 270 and 272 are illustrated. Significant members and methods of these classes are illustrated in FIG. 16 to FIG. 20.

Figure 16:
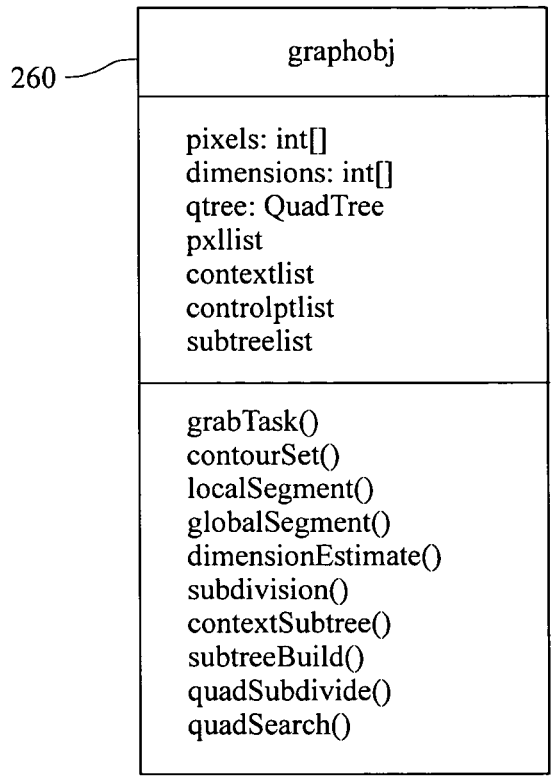
FIG. 16 shows members and methods of class graphobj.

The class 260 simulates a graphical object and is shown in detail in FIG. 16. The method grabTask( ) opens an image file representing an object and grabs image pixels into an array pixels. The method contourSet( ) tracks the edge of the object and saves contour pixels into a linked list pxllist. The methods localSegment( ) and globalSegment( ) segment the object into a number of contexts at discontinuities according to local and global criteria respectively. The local criteria can include local curvature and changes in slope, as well as distances to neighboring discontinuities, while the global criteria can include a global context dimension. The method dimensionEstimate( ) estimates the dimensions of contexts and saves the results into an array dimensions. The method subdivision( ) further subdivides contexts and saves the subdivision locations as the indices to pxllist to another linked list contextlist. The method contextSubtree( ) determines control points of different contexts and their subdivisions using rule-based fuzzy logic, and saves the calculated coordinates of control points into a linked list controlptlist, in which each element holds the coordinates of control point(s) for one context. Ideally, any calculated control point initially lying outside the object should be mirrored inside. The method subtreeBuild( ) constructs a subtree for each context, and saves the subtrees into a linked list subtreelist. For each context, every control point is a treenode of its subtree and the coordinate of the control point is associated with the treenode (using reference in Java language). For a 2D object, the class QuadTree simulates the data structure of a quadtree and can be an inner class of graphobj, similarly for 3D. The method quadSubdivide( ) recursively subdivides a object into a QuadTree object qtree. The method quadSearch( ) returns for an arbitrary pixel within the object the smallest quadtree (octree) node containing the pixel by recursively search down a QuadTree (Octree) object.

Figure 17:
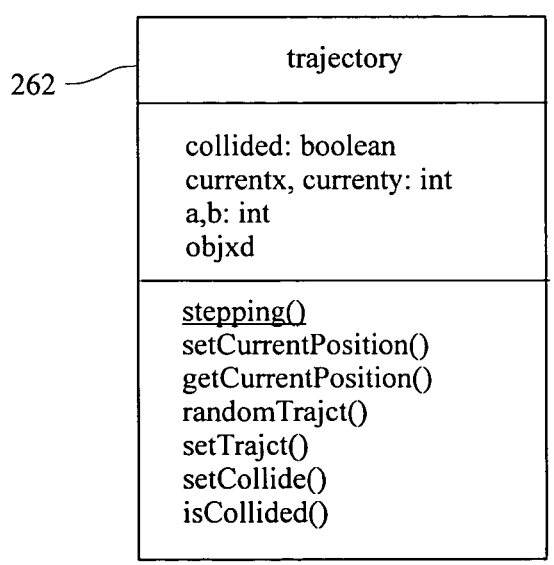
FIG. 17 shows members and methods of class trajectory.

The class 262 simulates a trajectory of an object and is shown in detail in FIG. 17. The members of currentx and currenty represent the centroid of an object objxd of class graphobj in a global coordinate system. a and b represent every move along x and y directions when objxd is stepped. The stepping happens when a class method stepping( ) of trajectory is called. The trajectory (represented by a and b) of an object can be set and randomized using methods setTrajct( ) and randomTrajct( ) respectively. The current position of an object can be also set and retrieved using methods setCurrentPosition( ) and getCurrentPosition( ). The flag collided indicates if objxd is collided with another object. This flag can be set and retrieved by methods setCollide( ) and isCollided( ) respectively. Trajectory can extend the class Thread in Java language. Generally, class trajectory can act as a bridge to transform points from local coordinate system of objxd to a global coordinate system. It can also include methods that simulate translation, rotation and scaling of an object, as well as relevant members and methods to transform between coordinate systems.

Figure 18:
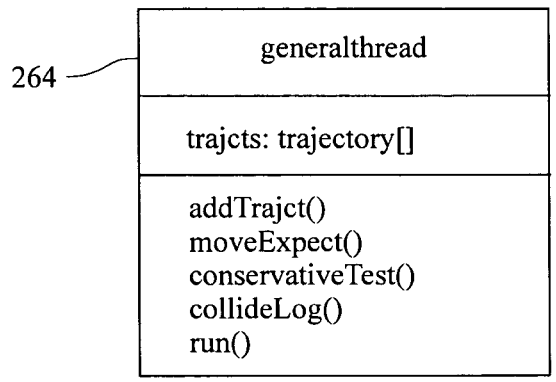
FIG. 18 shows members and methods of class generalthread.

The class 264 roughly tests if objects will collide and is shown in detail in FIG. 18. Class 264 (generalthread) extends the Thread class and overrides the run( ) method in Thread. Member trajcts is an array and each of its elements references a trajectory object. The method addTrajct( ) adds a number of trajectory objects to trajcts. In the simplest case, two objects of class trajectory will involve in an interaction simulation. The method moveExpect( ) compares the centroid positions of objects at previous simulation step with those at current step. moveExpect( ) can return a boolean value indicating whether or not objects are moved or an array representing distances between pairs of objects, which can be used for high level scheduling. If the high level scheduling decides to further check a pair of objects, run( ) will call conservative Test( ) method. The method conservativeTest( ) starts a search from the roots of skeletal trees, whose coordinates can be the centroids of objects, towards those tree nodes closer to another object. The searching can terminate at context level tree nodes, or alternatively can also terminate at tree nodes either higher or lower than the ones at context-levels. Distances between these tree nodes of different objects are calculated, and can be compared with some criteria. For context level tree nodes, a criterion can be that if the distance is bigger than a times the sum of the context dimensions calculated during the segmentation process. If these criteria are satisfied for a pair of tree nodes, the method conservativeTest( ) further tests if the pair is being checked by a detailthread object. If not, the run( ) method will proceed to construct and initialize an object of class detailthread for each pair of the tree nodes and call the start( ) method of the newly created detailthread objects. The method collideLog( ) prints collision location(s) and simulation time, as well as saves pixels into an image file. An embodiment of run( ) method of class generalthread is shown in the following pseudocode:

```
while (true) {
    while ( moveExpect( ) != true ) {
        sleep for a while;
    }
    if ( conservativeTest( ) == true )   // at least one detailthread object to spawn
    {
        for each close pair of tree nodes not in detailed checking
        {
            construct and initialize a detailthread object;
            call start( ) method of the detailthread object;
        }
    }
    sleep for a while;
    if iscollided( ) of any element in trajcts returns true
    {
        collideLog( );
        break;    // this thread terminates
    }
}
```

Figure 19:
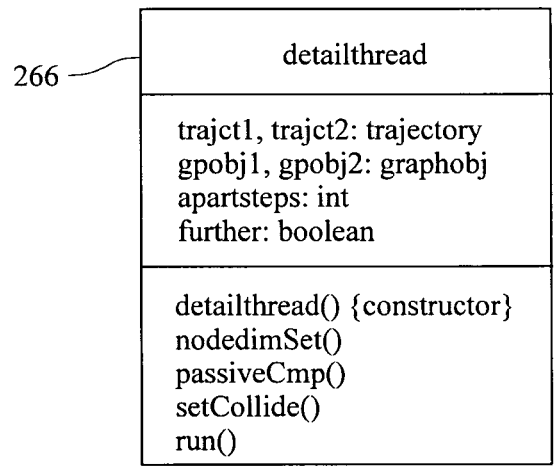
FIG. 19 shows members and methods of class detailthread.

The class 266 accurately checks interaction of objects and is shown in detail in FIG. 19. Class 266 (detailthread), which extends the Thread class and overrides the run( ) method in Thread, has two trajectory members trajct1 and trajct2 which represent trajectories of two graphobj objects gpobj1 and gpobj2. The members of further and apartsteps indicate whether the two objects are leaving each other and the consecutive steps of leaving apart, together they can indicate objects will not collide and thus the present thread can terminate. The constructor detailthread( ) can take two trajectory objects and a pair of their tree nodes as arguments, and set trajct1 and trajct2 to reference the trajectory objects. The method nodedimSet( ) converts the coordinates of control points to quadtree nodes by calling quadSearch( ) method of gpobj1 and gpobj2, thus obtain the smallest quadtree nodes containing the control points. This method can also check if the quadtree (octree) nodes for either object are identical if there are multiple nodes involved. The method passive Cmp( ) converts local coordinates of terminal quadtree (octree) nodes to a global coordinate system and check if the tree nodes of objects overlay in both x and y directions for 2D (overlay in x, y, z directions for 3D). If overlay happens, then collision is detected. The detection of collision can trigger collision response processing, as well as setting flags, stopping ticking of movetimer object if so desired by applications. The method setCollide( ) calls setCollide( ) methods of trajct1 and trajct2. An embodiment of run( ) method of detailthread is shown in the following pseudocode:

```
while (true)
{
    if( passiveCmp( ) == true )    // collided
    {
        setCollide( );
        break;      //this thread terminates
    }
    if( trajct1.isCollided( )||trajct2.isCollided( ) )    // collision detected by other threads
        break;      //this thread terminates
    if terminating conditions satisfied      // objects have been leaving apart for a while
    {
        call class method of space to update its class member checkingpair
        break;     // this thread terminates
    }
    sleep for a while;
}
```

Figure 20:
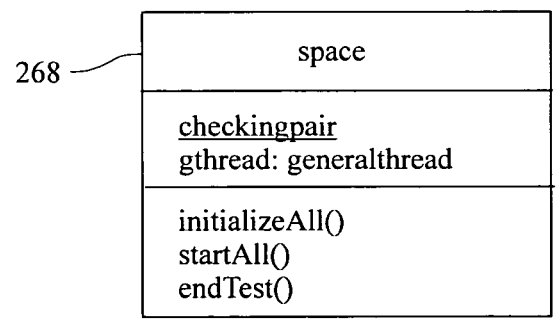
FIG. 20 shows members and methods of class space.

The class 268 manages other classes and is shown in detail in FIG. 20. Class 268 (space) has a class member checkingpair which holds indices of skeletal tree nodes currently being checked in pairs by detailthread objects. checkingpair can be implemented as a linked list. Before an object gthread of class generalthread spawns a new detailthread object, elements of checkingpair are first checked. When gthread spawns a new detailthread object or a detailthread object terminates itself, the contents of checkingpair are updated by calling relevant class methods, which read or write checkingpair. The methods that modify checkingpair should be synchronized. The method initializeAll( ) constructs and initializes objects of classes graphobj, trajectory and generalthread. Then in method startAll( ), the start( ) methods of the thread objects are called. The method endTest( ) can test if the generalthread object gthread is alive for some applications.

Two other classes 270 and 272 are called movetimer and display respectively. The class movetimer simulates a clock ticker which calls the class method stepping( ) of class trajectory at a fixed time interval; the class display can interactively display the simulation of object interaction on a computer screen. Both can be implemented by those skilled in the art and don't belong to the scope of the present invention.

CONCLUSION, RAMIFICATION, AND SCOPE

Thus, the reader will see that the present invention is based on inherent properties of parametric representations. When parametric curves are built (i.e. the curves are constructed and associated with models), these properties are taken into account. Afterwards, the mechanism of underlying deformation is directly represented and controlled by the properties of curves. The overall approach is significantly different from prior art techniques. In the prior art, the buildup of parametric models and the deformation tend to be isolated from each other. Therefore, the present invention can be considered as an approach that parameterizes (the mechanism of) deformation.

The present invention can offer high-level abstraction. The hierarchy (in FIG. 2) allows a few control points to control a complex geometric model. This approach also allows a model to be modified on the basis of anatomy.

The present invention allows any polygonal vertex to be controlled by a number of parametric curves. Thus, the method can facilitate complex and subtle control of the model. Generally, previous methods using parametric representations don't have an inherent mechanism of many-to-one control.

Since the present invention simulates mechanism of deformation (e.g. muscle contraction), it is intuitive to users. For example, an artist or a normal computer user with a understanding of facial muscles can use this technique.

The reason of these benefits is that the present invention directly uses parametric representations to simulate the mechanism of deformation. This approach uses the inherent properties of parametric curves to simulate complex movement. Previously, these properties and their potential in modeling have not been fully utilized.

Singh and Fiume's method does not make use of the analogies of curve modification and muscle movement. Their method needs more tools, is more demanding in computational cost and less intuitive to users, and generates less realistic results than the present invention.

The present invention simulates the facial muscles by changing the weight of the NURBS curves, or repositioning control points. As a NURBS curve is defined by its control points, weights and knots, modifying any of these changes the shape of the curve. Furthermore, a NURBS curve can be presented differently using reparameterization. Therefore, it is possible to come up with many other solutions to change a curve shape. The present invention use polygon representation to model and deform human faces. The same principle can be used in modeling objects represented by other models rather than polygonal models, such as parametric patch nets.

The NURBS curve is a general parametric curve and some other parametric curves, such as the Bézier curve and B-spline curve, are special cases of the NURBS curve. Therefore, these curves may also be used in modeling and animation in a similar way. Parametric curves belong to parametric representations, which belong to analytical representations. Other forms of analytical representations include implicit forms, which may be used in a similar way in controlling modeling and animation.

Another embodiment is to employ multiple NURBS curves on a facial unit, especially those units with large surface areas, such as the cheek and forehead. When the density of the curves and their sample points reaches the requirement of the Sampling Theorem, the procedure of associating vertices with NURBS curves can be greatly simplified. Thus, any vertex can be associated with a sample point of a NURBS curve based on the minimum distance, and a ratio of movement may not be needed. Modifying the NURBS curves and thus moving the vertices can simulate facial expressions. Another embodiment is to associate the mouth vertices with different NURBS curves for different expressions, instead of two curves (Curves 106 and 108 in FIG. 4A), and turn on/off the effect of these curves depending on the desired expression.

Modeling facial movements using NURBS curves is a geometric modeling method. This approach can be enhanced by other techniques, such as physics-based models, and vector analysis, etc. Physics-based models usually mean differential equations and/or biomechanical models are used to analyze the interaction of forces, object characteristics and deformations. Vertices can also move along vectors perpendicular to the model surface, to simulate effects such wrinkles.

The present invention allows a model to be remotely controlled. For example, parameters of analytical representations (e.g. parametric curves) and/or their changes can be sent to a remote location via a communication link to generate deformation at the remote location.

The foregoing describes only some embodiments of the present inventions, and modifications obvious to those skilled in the art can be made thereto without departing from the scope of the present invention.

Surface-based methods in the prior art are based on interference testing of polyhedra. To speed up the testing, hierarchical bounding entities are used to approximate the polyhedra. There are some inherent problems with the surface representation, such as co-planer vertices and convexity (see Jiménez et al). In addition, there are circumstances in which polyhedral approximations are not available. In contrast, the present invention represents an object with a skeletal tree and volumetric entities associated with tree-nodes.

The hierarchical bounding entities of surface-based methods are built externally to the objects. When the objects are deformed, these entities need to be updated. Thus, the bounding entities are external to objects and oriented towards rigid models. In contrast, the present invention associates skeletal trees with the volumetric entities that are internal to the objects. The update of the volumetric entities is a direct result of object deformation.

Surface-based methods use different tools in various phases of simulation, e.g. skeletal trees in deforming individual objects and bounding entities in detecting collision. Thus, simulation procedures tend to be isolated from each other in the prior art. Although there are quick computations individually for medial axes, collision detection and Voronoi regions, etc, the overall processing is not necessarily optimized for simulating deformable objects. In contrast, the present invention can use skeletal trees for these procedures. Besides deformation and collision detection, tree structures can also be used in physical simulation for collision response (see Moore and Wilhelms). A possible scenario is using skeletal tree-nodes to detect collision, and updating tree-nodes for collision response. Therefore, all phases of object deformation and object interaction may be unified through skeletal tree.

The present invention presents a method in modeling object interactions on the basis of volumetric representation and analysis, in contrast with predominant surface-based approaches in prior art. There can be various alternatives, modifications, and equivalents, as well as hybrid models by combining the principle of the present invention with prior art techniques.

A skeletal tree is a simplified representation of an object. Tree nodes of a skeletal tree can be conveniently traversed. Other forms of simplified object representations may also be used in object simulation in a similar way as in the present invention.

Besides building a skeletal tree bottom-up as described above, there are some other embodiments. Another embodiment can be building a skeletal structure top-down using a known or future skeletonization method, then building hierarchical bounding volumes (spheres, boxes, etc.) around some points at intervals on the skeletal structure. The skeleton points can thus be adaptively adjusted to the centers of the bounding volumes. An advantage of this top-down approach is that the segmentation process can be bypassed. That is, the segmentation can be considered as a sufficient but not necessary procedure. This scenario also shows a hybrid model from the present invention and prior arts.

In another embodiment, if a parallel architecture (such as mesh computer, pyramid computer, etc. all with multiple processors) is utilized, the data structures may be dramatically different from the ones described above. It is known in the area of parallel computing that the data structure is typically determined by the machine model.

The skeletal structure described above may not only used in geometrically modeling object interaction, but also in generating multi-resolution volume hierarchy for physical simulation, in which differential equations are used to analyze the interaction of forces and object characteristics. That is, physical and geometric simulation may be integrated through the volumetric skeletal structure.

For collision response, the skeletal tree may be conveniently used in the analytical simulation and the animation. After calculating for deformation, the coordinates associated with the relevant nodes in the skeletal tree can be updated. Then, the skeletal tree may be used to guide the update of the quadtree (octree) representing objects. For example, a neighborhood of a control point, such as a tree node of the quadtree, can move with the control point. Then the movement of nearby elements, such as other tree nodes of the quadtree, can be interpolated. If an object is properly segmented and subdivided, and the nodes in the skeletal tree represent the object in sufficient details, the updated quadtree may faithfully represent the object after the update. This scenario shows the potential of automatic update of a skeletal tree for the simulation of collision response.

With the assistance of predicting contact locations, the skeletal tree of objects may be dynamically subdivided at the prospective contact locations. That is, in run time, skeletal tree are further generated in greater details and thus volume objects are subdivided into high-resolutions at the prospective contact locations. At the prospective contact locations, analytical and/or physical stimulation, such as Finite Element Models (FEM) or the linked volume model, may also be conducted to simulate deformation, possibly at some key points and deformation of nearby elements can be interpolated. Therefore, collision detection and response may be integrated through skeletal trees.

Another embodiment is not to use multithreads for concurrent processing during interaction simulation. That is, the principle described in this section can also be used in single thread processing or other concurrent approaches.

The disclosed technique can be used to detect multiple contacts between objects, as well as the self-contact of one object. Compared with the occupancy map methods in prior art, the present method can represent objects economically and detect interactions accurately, and can only consume a small amount of memory at run time.

The invention claimed is:
1. A computerized method for using curves to construct and control a geometric model of at least one physical object for simulation, animation or visual communication by a computer, said method comprising the steps of:
(a) providing to the computer a geometric model representing a physical object, at least a portion of the topography of the surface of said physical object being controlled by an underlying muscle mechanism of deformation of said physical object;

(b) providing and locating at least one control curve in the model based on the topography of said model such that modification of at least a section of said control curve has an effect on the topography of the model that is geometrically analogous to the effect of movement of the underlying muscle mechanism of deformation has on the topography of the surface of said physical object;

(c) associating elements of said model with elements of said at least one control curve by the computer so that said curves control movement of said elements of said model;

(d) dynamically modifying said at least one curve so that said model is dynamically changed so as to simulate the effect of the movement of the underlying muscle mechanism of deformation on the topography of the surface of the object to move a particular point on said surface to a different location, wherein said modifying of said curves is integral to simulating movement in the model equivalent to movement due to the underlying muscle mechanism of deformation of the physical object; and (e) displaying the dynamically changed model.

2. The method of claim 1 wherein said curves are initially determined by the structure and the mechanism of deformation of the object.

3. The method of claim 1 wherein the association of said elements of said model and said elements of said curves is predetermined by the underlying mechanism of deformation of the object.

4. The method of claim 1 wherein each said element of an area of said model is associated with a sample element of at least one curve such that said element of said model is controlled by said at least one sample element, said area corresponding to said portion of the topology of the shape of said physical object.

5. The method of claim 4 wherein said element of said model is associated with said sample element of said at least one curve through a spatial gradient of said element of said model, the association being established when said sample element and said gradient satisfy a predetermined geometrical condition.

6. The method of claim 5 wherein the direction of said spatial gradient is geometrically analogous to a movement direction in proximity to the location of said element of said model, said movement direction being caused by said underlying mechanism of deformation.

7. The method of claim 1 wherein any one of said elements of said model is associated with and controlled by at least one of said curves-so that any one of said elements of said model can be controlled by either one or a plurality of said curves.

8. The method of claim 1 wherein the modification of said curves is predetermined by an underlying mechanism of deformation of a muscle-of the physical object.

9. The method of claim 1 wherein said curves are parametric curves, whereby properties of the parametric curves are used to describe and simulate the underlying mechanism of deformation of the object.

10. The method of claim 9 wherein said parametric curves are Non-Uniform Rational B-Splines (NURBS) curves, said properties comprise the properties that describe the repositioning of control points of the NURBS curves, and the modification of weighing parameters of the NURBS curves, such that repositioning control points and changing weighing parameters can modify the NURBS curves, which in turn can modify said model.

11. The method of claim 9 wherein control points of said parametric curves are located with respect to the topography of said model including various portions of anatomy.

12. The method of claim 1 wherein control parameters of said curves are set to different sets of values so that each set of the values produces a different shape of said model.

13. The method of claim 12 wherein locations of said curves are subject to an interpolative process so that any additional shape of said model is produced.

14. The method of claim 1 wherein;

the physical object is substantially an entire face;

the underlying muscle mechanism of deformation is underlying facial muscles;

the at least one control curve is at least one Non-Uniform Rational B-Spline (NURBS) parametric curve and modification of parameters of at least a section of said NURBS curve has an effect on the topography of the model that is geometrically analogous to the effect the movement of the underlying facial muscles has on the topography of the surface of the face, said curves being such that repositioning of control points of the NURBS curves and/or modification of weighing parameters of the NURBS curves provide said modification of parameters of the NURBS curves;

dynamically modifying said at least one curve is achieved by modifying parameters of the curve such that the effect generated in said model of the face is dynamically changed in the same way a face would change due to movement of underlying facial muscles so as to simulate the deformation of the face; and wherein said modifying of said parameters of the curves is integral to simulating movement in the model of the face in the form of movement of a particular point on the surface of the face to a different location, which is equivalent to movement due to the mechanism of deformation caused by underlying facial muscles.

15. The method of claim 14 wherein the physical object has an underlying linear muscle and movement of the linear muscle is simulated in the model by changing the weight of one control point of the curve.

16. The method of claim 14 wherein the physical object has an underlying sphincter muscle and movement of the sphincter muscle is simulated in the model by updating the weights of several neighboring control points of the curve.

17. The method of claim 14 wherein the physical object has an underlying sheet muscle and movement of the sheet muscle is simulated in the model by updating the weights of several neighboring control points of the curve.

* * * * *